April 28, 1964   R. R. REINHARD   3,130,529
ICE CREAM FILLING MACHINE
Filed Dec. 30, 1960   2 Sheets-Sheet 1

INVENTOR.
Robert R. Reinhard
BY
Flehr and Swain
ATTORNEYS.

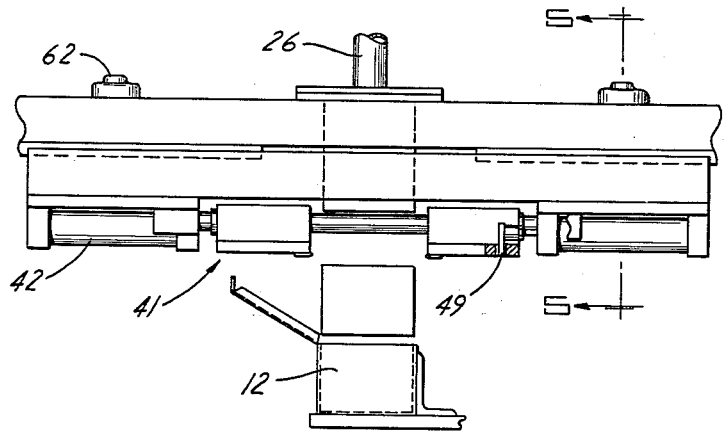
FIG_3_
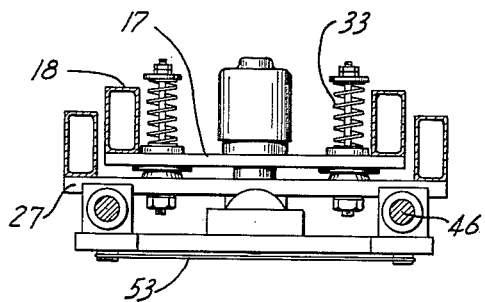
FIG_4_
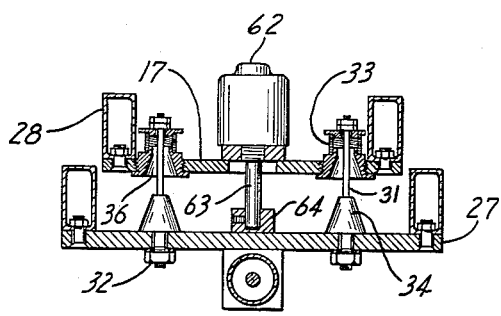
FIG_5_
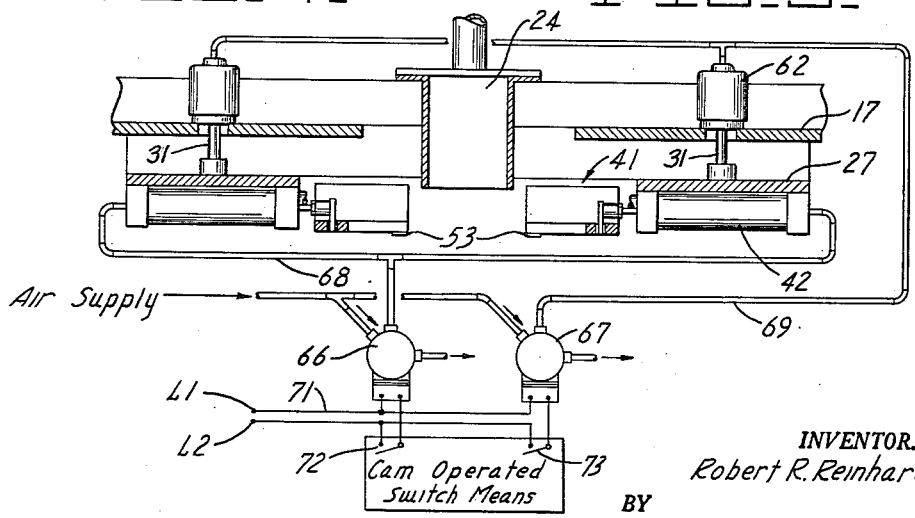
FIG_6_
INVENTOR.
Robert R. Reinhard.
ATTORNEYS 0# United States Patent Office 3,130,529
Patented Apr. 28, 1964

3,130,529
ICE CREAM FILLING MACHINE
Robert R. Reinhard, La Crescenta, Calif., assignor to Foremost Engineering, Inc., Los Angeles, Calif., a corporation of California
Filed Dec. 30, 1960, Ser. No. 79,737
4 Claims. (Cl. 53—123)

This invention relates generally to machines for introducing measured amounts of a frozen material, like ice cream, into marketing cartons.

In the past, certain ice cream filling machines have been made which employ an extrusion nozzle from which frozen material discharges at a constant rate. Cutoff means is provided which is actuated at regular timed intervals whereby successively severed masses of the material are of predetermined dimensions and weight. The use of machines of this type has in the past been confined to the formation of frozen masses of relatively small dimensions, such as are marketed for individual consumption.

The above described machines have not been usable for the filling of larger cardboard containers, such as square cornered half-gallon cartons of interlocking wall construction. The present practice is to fill such bulk ice cream cartons by a stream of semifrozen material which has sufficient fluidity to mold itself within the container. One objection to this type of filling operation is that it requires maintenance of the ice cream in semifrozen and relatively fluid form. In addition, the sides and ends of the container must be adequately supported during filling, and frequently undesirable spillage occurs.

Another type of cardboard container is available but has not yet been widely used in the ice cream industry. It has end walls formed of tabs that are adhesively secured together, and therefore has better strength than containers with interlocking tabs.

In general, it is an object of the present invention to provide an improved filling machine of the first described type, which is capable of use with square cornered cardboard containers such as has been employed in the marketing of bulk ice cream.

Another object of the invention is to provide a machine of the above character which lends itself to high speed filling operations.

Another object of the invention is to provide a machine of the above character having improved cutoff means that is adapted for successful use on a moving mass of semihard ice cream or like frozen material, where the cross sectional dimensions of the mass are relatively large compared to prior machines of this general type.

Additional objects and features of the invention will appear from the following description in which the preferred embodiment has been set forth in detail in conjunction with the accompanying drawing.

Referring to the drawing:

FIGURE 3 shows the cutoff means of FIGURE 1, but with the carriages in a lowered position;

FIGURE 4 is a cross sectional view taken along the line 4—4 of FIGURE 1, and

FIGURE 5 is a cross sectional detail taken along the line 5—5 of FIGURE 3.

FIGURE 6 is a schematic view illustrating a pneumatic system for the machine.

Figure 1:
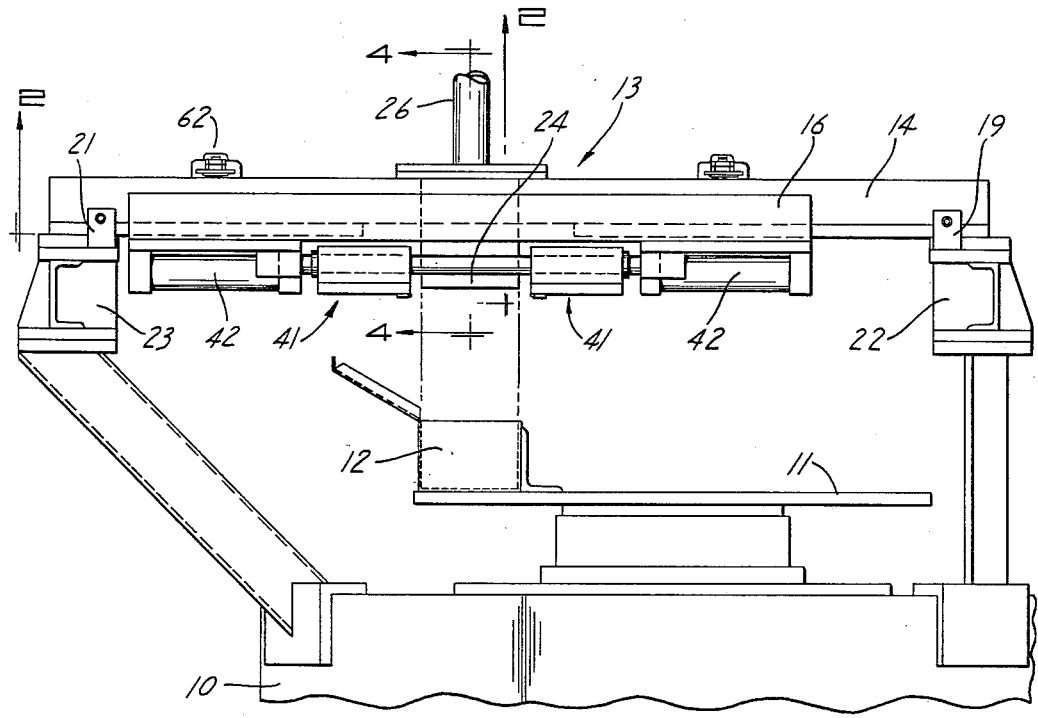
FIGURE 1 is a side elevational view illustrating a part of an ice cream filling machine, incorporating the present invention.

The machine illustrated in FIGURE 1 consists of a main frame or base 10 which serves to mount the turntable 11. This turntable is of the indexing type, and is associated with suitable feed and discharge conveyers (not shown). It is provided with a plurality of circumferentially spaced pockets, each adapted to receive a carton 12. The indexing of the turntable serves to present the cartons 12 one at a time, to a filling station.

Overlying the turntable 11 there is an assembly 13 which includes an extrusion nozzle and cutoff means, together with two mounting supports 14 and 16. The first support 14 can consist of flat plates 17, having their margins secured as by bolting or welding to the rigid structural members 18. The end portions of this rigid support are shown engaged by the clamps 19 and 21, which in turn are carried by the portions 22 and 23 that are attached to or form parts of the main machine frame.

The space between the plates 17 accommodates the extrusion nozzle 24, which in this instance is square or rectangular in section. The nozzle is shown connected to the pipe 26, which leads to a machine that supplies semihard ice cream at the required extrusion pressure.

The second support 16 likewise can be formed of metal plates 27, each having the structural members 28 attached to its margins. The spacing between structural members 28 is sufficient whereby normally these members are disposed alongside the structural members 18, in the manner as shown in FIGURE 4.

The means employed for connecting the second support to the first, serves to yieldably urge the second support upwardly to a normal limiting position, and at the same time serves to insure proper alignment of the second support. Thus as shown particularly in FIGURE 5, rods 31 extend loosely through the plates 17 and 27. The lower ends of these rods are shown provided with nuts 32, and are thus loosely retained with respect to the plates 27. The upper ends of the rods 31 are engaged by compression springs 33, whereby the rods are urged upwardly. Conical shaped centering members 34 are retained by the lower portions of the rods 31, immediately above the plate 27, and are adapted to seat within the conical socket members 36, carried by the upper plate 17. Thus by virtue of the action of the springs 33, the conical members 34 normally seat within the socket members 36, thereby forming a limiting position for the second support 16, and likewise serving to align the second support and the parts carried by the same, each time the second support 16 returns to its upper limiting position.

Figure 2:
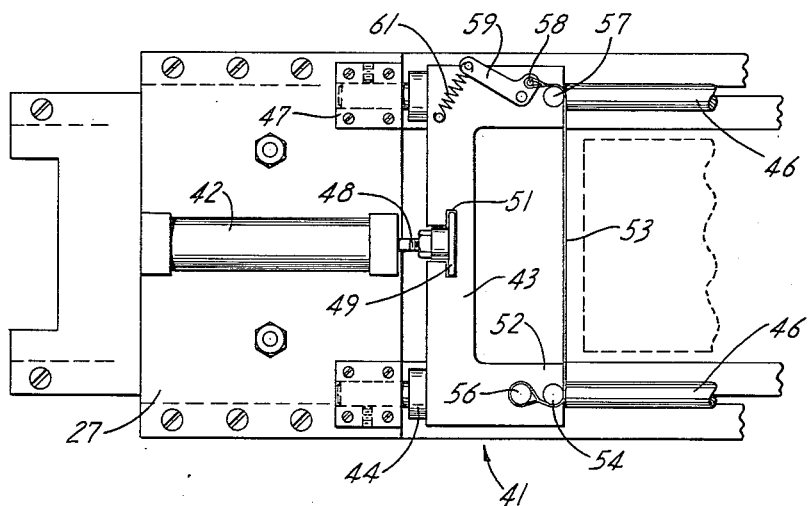
FIGURE 2 is an enlarged detail of a part of the cutoff means and associated parts, looking toward the bottom side of the same.

The cutoff means consists of reciprocating carriages 41 that are carried by the second support 16. These carriages are operated by motive devices 42, which can be of the pneumatic type. As shown particularly in FIGURE 2, each carriage 41 can consist of a substantially U-shaped member 43, which is provided with guide blocks 44 that slidably engage the guide rods 46. The ends of the guide rods are secured to the plate 27 by the mounting blocks 47. As shown in FIGURE 2, the motive device 42 is in the form of a pneumatic cylinder type of operator provided with an internal return spring (not shown), and with an operating rod 48. A head 49 on rod 48 engages within a T-shaped slot 51, formed in the U-shaped member 43. The legs 52 of the U-shaped member 43 serve to carry the cutoff wire 53. One end of this wire is shown engaging the stud 54, and anchored by stud 56. The other end is shown engaging about stud 57, and is anchored on pin 58 on one arm of the lever 59. This lever is continuously urged in one direction, as by spring 61, to provide proper tension for the wire 53. By means of suitable electrical connections (not shown), a current of proper value can be continuously supplied to the wire 53, whereby this wire is heated to an elevated temperature.

In the complete assembly the wires 53 are disposed in a common plane, and when retracted, they are spaced apart as shown in FIGURE 2. When advanced they are brought into close parallel proximity to complete a cut-off operation.

Additional motive means is provided for moving the second support 16 downwardly, together with all of the working parts carried by the same. As shown particularly in FIGURES 1 and 3, two such motive devices are provided, in the form of pneumatic operators 62 of the diagram or piston type. These operators are mounted upon plates 17 (FIGURE 5), and the operating rods 63 of each device are suitably attached to the plate 27, as indicated at 64. Preferably these connections, together with the manner in which rods 31 form connections between the plates 17 and 27, provides a fair amount of articulation when the plate 27 is moved downwardly to unseat the conical members 34.

FIGURE 6 schematically shows a suitable pneumatic system for connection with the pneumatic operators 42 and 62. Solenoid operated control valves 66 and 67 are connected to a source of compressed air as indicated, and also they are connected respectively by pipelines 68 and 69 to the pneumatic operators 42 and 62. Assuming that control valve 66 is energized, it supplies air under pressure to line 68, thus causing the operators 42 rapidly to advance the carriages 41. When the control valve 67 is energized, it supplies air under pressure to the operators 62, thus causing these operators to move the second support 16, together with the carriages 41 and the operators 42 downwardly. The electrical energizing circuit 71 for the solenoids 66 and 67, may include current supply lines L1 and L2 and switches 72 and 73. As indicated, these switches can be operated by suitable cam means mechanically connected for operation in synchronism with other parts of the filling machine.

Operation of my machine is as follows: When in operation, semihard ice cream is being supplied through the pipe 26 at a constant rate, and this material fills the interior of nozzle 24, and forms a flowing mass which discharges at a constant rate from the lower end of the same. Assuming that the nozzle 24 is rectangular in section, the discharging mass of material is of the same configuration, and the dimensions are such that when severed, a mass of the material will readily be accommodated within the carton 12. During the interval that the turntable 11 is rotating to bring carton 12 into filling position, the semihard mass of frozen material is progressing downwardly from the lower end of the nozzle 24. Immediately when the carton comes to rest, the pneumatic operators 42 are energized whereby the carriages 41 and the cutoff wires 53 are moved forwardly at a rapid rate until they are nearly in contact. At that time, a mass of the frozen material is severed and drops into the carton 12. Immediately thereafter the turntable 11 indexes to a new position, thus bringing a fresh carton into filling position. At this time the operators 42 are de-energized whereby the carriages and cutoff wires commence to retract, under the urge of the springs contained within the operators 42. At the time such retraction commences, operators 62 are energized whereby they commence to move the second support 16 downwardly, thus causing downward movement of both the cutoff wires. Such downward movement continues until the cutoff wires have been completely retracted, after which the operators 62 are de-energized, thus permitting the springs 33 to return the second support 16 back from the lowered position of FIGURES 3 and 5 to the normal upper position of FIGURES 1 and 4. While a certain amount of articulation is permitted during retraction of the cutoff wires, return to the upper limiting position causes proper realignment, due to seating of the conical members 34 within the socket members 36. Downward movement of the cutoff wires during retraction makes possible continued downward movement of the frozen mass, without causing the cutoff wires to move back through the frozen material.

It will be evident from the foregoing that I have provided an ice cream filling machine which is capable of a high production rate, and which is adapted to fill pasteboard cartons of substantial size such as are commonly used in the marketing of bulk ice cream. I prefer to employ cartons having end walls formed of flaps adhesively secured together, as distinguished from end walls formed of interlocking tabs. A fill is obtained consisting of a measured amount of ice cream, without danger of spill. After each carton is filled, the top flap can be folded over and secured adhesively, thus providing a strong and sanitary package.

I claim:

1. In a filling machine of the type in which a flowable frozen food material is supplied under pressure to a nozzle from which the product is discharged as a continuously moving mass that is of predetermined configuration in section, means forming a fixed main support, a second support disposed adjacent the first support, nozzle means carried by the main support for discharging a continuously moving mass of frozen material, the movement of the material being on a rectilinear axis, said second support being movable relative to the first support and in a direction corresponding to the direction of movement of the mass, two carriages disposed on opposite sides of the nozzle, means on the second support for slidably retaining and guiding the carriages for rectilinear reciprocation of the same in opposite directions to advance or retract the same relative to the nozzle, two cutoff means carried by said carriages and disposed on a common plane perpendicular to said axis, said cutoff means being moved through the mass of frozen material and retracted therefrom when said carriages are advance and retracted, two motive means mounted on said second support for advancing and retracting each of said carriages, means for yieldably urging said second support toward a limiting position relative to the main support, and additional motive means for moving the second support in a direction away from the main support and in a direction corresponding to the direction of movement of the frozen mass, during retraction of the carriages the common plane of the two cutoff means being maintained perpendicular to said rectilinear axis during such movement of the second support.

2. A machine as in claim 1 in which the second support is disposed below the first support and extends generally in a common plane on opposite sides of the nozzle, the means for yieldably urging the second support consisting of a plurality of spaced springs seated on the first support and disposed on opposite sides of the nozzle and means serving to connect each of said springs to the second support.

3. A machine as in claim 2 in which means are provided for determining said limiting position, said means including interfitting members secured to the main and second supports and serving to center the second support in said limiting position of the same.

4. In a filling machine of the type in which a flowable frozen material is supplied under pressure to a nozzle from which the product is discharged as a continuous moving mass that is of predetermined configuration and section, means forming a horizontal plate-like main support, a second plate-like support disposed below the first support and parallel thereto, nozzle means carried by the main support and extending downwardly between portions of said second support, said nozzle means serving to discharge a mass of frozen material with continuous movement of the material on a rectilinear axis, the second support being moveable in a vertical direction relative to the first support, two carriages disposed on opposite sides of the nozzle, means on the second support for slideably retaining and guiding the carriages for rectilinear reciprocation of the same in opposite directions to advance or retract the same relative to the nozzle, two cutoff means of the hot wire type carried by said carriages and disposed in a common horizontal plane, said cutoff means being moved through the mass of frozen material and retracted therefrom when said carriages are advanced and retracted, two motive means mounted on said second support for advancing and retracting each of said carriages, a plurality of spaced vertical rods disposed on opposite sides of said nozzle and extending generally perpendicular to said main support, said rods having lower ends thereof attached to said second support, said main support having opening to accommodate said rods, springs carried by the main support and engaging said rods, thereby urging the rods and the second support toward the main support, means for limiting movement of the second support toward the main support comprising interfitting members associated with each of said rods, said interfitting members serving to centralize the second support in said limiting position, and additional motive means connected to said second support and serving to move the second support downwardly away from the main support to permit free retraction of the carriages and cutoff means, said last named motive means having points of connection to said second support at points located on opposite sides of said nozzle.

References Cited in the file of this patent

UNITED STATES PATENTS

| | | |
|---|---|---|
| 1,105,041 | Phillips | July 28, 1914 |
| 1,975,936 | Goodwin | Oct. 9, 1934 |
| 2,089,273 | Lakso | Aug. 10, 1937 |
| 2,573,100 | Haecks | Oct. 30, 1951 |
| 2,699,281 | Duke | Jan. 11, 1955 |

FOREIGN PATENTS

| | | |
|---|---|---|
| 495,264 | Canada | Aug. 11, 1953 |